(12) United States Patent
Kawanishi et al.

(10) Patent No.: US 7,245,787 B2
(45) Date of Patent: Jul. 17, 2007

(54) BIAS ADJUSTMENT METHOD FOR OPTICAL SSB MODULATOR OR OPTICAL FSK MODULATOR

(75) Inventors: Tetsuya Kawanishi, Koganei (JP); Masayuki Izutsu, Koganei (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 0 days.

(21) Appl. No.: 11/078,695

(22) Filed: Mar. 14, 2005

(65) Prior Publication Data
US 2005/0213862 A1 Sep. 29, 2005

(30) Foreign Application Priority Data
Mar. 16, 2004 (JP) ............................ 2004-074639

(51) Int. Cl.
*G02F 1/01* (2006.01)
*G02F 1/225* (2006.01)

(52) U.S. Cl. .................... 385/1; 385/3; 385/39; 385/40
(58) Field of Classification Search .................. 385/1–3
See application file for complete search history.

(56) References Cited

U.S. PATENT DOCUMENTS

| | | | |
|---|---|---|---|
| 5,835,212 A * | 11/1998 | Kissa et al. ................. 356/477 |
| 6,211,996 B1 * | 4/2001 | Fuse ............................ 359/278 |
| 6,915,082 B2 * | 7/2005 | Yano .......................... 398/188 |
| 2005/0220385 A1 * | 10/2005 | Kawanishi et al. ............ 385/1 |

* cited by examiner

*Primary Examiner*—Tim M. Wong
(74) *Attorney, Agent, or Firm*—Westerman, Hattori, Daniels & Adrian, LLP.

(57) ABSTRACT

A method of appropriately adjusting a bias signal of an optical modulator is provided. For an optical modulator provided with a first sub Mach-Zehnder waveguide, a second sub Mach-Zehnder waveguide and a main Mach-Zehnder waveguide, a predetermined signal is supplied to the main Mach-Zehnder waveguide, and bias signals supplied to the first and second Mach-Zehnder waveguides are adjusted so as to lower an amplitude of an output light of the main Mach-Zehnder waveguide.

5 Claims, 4 Drawing Sheets

BIAS ADJUSTMENT METHOD FOR OPTICAL SSB MODULATOR OR OPTICAL FSK MODULATOR

BACKGROUND OF THE INVENTION

1. Field of the Invention

The present invention relates to a bias adjustment method and the like for an optical modulator.

2. Description of the Related Art

In a wavelength multiplexing optical communication system of the next generation, it is expected that a switch-over between wavelength channels is performed in a node. Therefore, a wavelength conversion apparatus is required in the wavelength multiplexing optical communication system. As a wavelength conversion apparatus, an optical single sideband (SSB) modulator is known. The optical SSB modulator is an optical modulator which can obtain an output light having shifted for a frequency of a modulating signal (e.g. as described in [S. Shimotsu, S. Oikawa, T. Saitou, N. Mitsugi, K. Kubodera, T. Kawanishi and M. Izutsu, "Single Side-Band Modulation Performance of a LiNbO3 Integrated Modulator Consisting of Four-Phase Modulator Waveguide," IEEE Photon. Tech. Lett., Vol. 13, 364-366 (2001)] and [Shimotsu Shinichi, Masayuki Izutsu, "LiNbO3 optical SSB modulator for next-generation communication", Optical Alliance, 2000.7. pp. 27-30]).

FIG. 4 is a schematic diagram showing a basic arrangement of an optical SSB modulator. As shown in FIG. 4, an optical SSB modulator 101 is provided with a first sub Mach-Zehnder waveguide ($MZ_A$) 102, a second sub Mach-Zehnder waveguide ($MZ_B$) 103 and a main Mach-Zehnder waveguide ($MZ_C$) 104.

In the optical SSB modulator 101, sinusoidal radio frequency (RF) signals (modulating signals) different from each other by a phase of 90° are inputted to four arms paralleled in $MZ_A$ 102 and $MZ_B$ 103. Also with respect to light, bias signals are inputted so that phase differences of the light in the four arms are respectively 90°. Then, a light whose frequency is shifted by the frequency of the modulating signal is outputted. The direction of frequency shifting, namely whether the frequency is increased or decreased, can be selected by controlling the bias signal provided to the $MZ_C$ 104.

It is to be noted that the operation of the conventional optical SSB modulator is described in detail in, for example, [Tetsuya Kawanishi, Masayuki Izutsu, "Optical frequency shifter using optical SSB modulator", TECHNICAL REPORT OF IEICE, OCS2002-49, PS2002-33, OFT2002-30 (2002-08)] and [Higuma et al., "X-cut lithium niobium optical SSB modulator, Electron Letter, vol. 37, 515-516 (2001)].

In the conventional optical SSB modulator, the bias signal has been adjusted as follows in order to obtain a phase of light in the arm of each MZ waveguide described above. Namely, amplitudes (voltages) of the signals supplied to the $MZ_A$ 102 and the $MZ_B$ 103 are slightly adjusted so that the output from the $MZ_C$ is minimized. Thereafter, modulation signals are impressed to the $MZ_A$ 102 and $MZ_B$ 103, and an amplitude of the bias signal supplied to the $MZ_C$ is slightly adjusted so that unnecessary contents included in the output lights are minimized. Such operations were repeated.

However, in some cases the bias signal cannot be optimally adjusted due to an influence of an initial state of the $MZ_C$ 104. Also, there are cases in which the output from the $MZ_C$ 104 becomes 0 even when the optical phase in both arms of the $MZ_A$ 102 and $MZ_B$ 103 are not mutually different by 180°. Therefore, there has been a problem that the phase of light cannot always be appropriately adjusted with the conventional adjustment method. Also, when adjusting the bias signal supplied to the $MZ_A$ 102 and $MZ_B$ 103 in a state where a signal is not supplied to the $MZ_C$ 104, there has been a problem that the bias signal cannot always be appropriately adjusted due to an influence of potentials or the like of the $MZ_C$ 104, as described in Shimotsu Shinichi, Masayuki Izutsu, "LiNbO3 optical SSB modulator for next-generation communication", Optical Alliance, 2000.7. pp. 27-30.

SUMMARY OF THE INVENTION

The present invention is made to solve the above-mentioned problems in the conventional optical modulator. Namely, an object of the present invention is to provide a method of appropriately adjusting a bias signal of an optical modulator.

[1] In order to solve the above-mentioned problems, a bias adjustment method of the present invention is one for an optical SSB modulator or an optical FSK modulator including a first sub Mach-Zehnder waveguide, a second sub Mach-Zehnder waveguide and a main Mach-Zehnder waveguide equipped with the first and second Mach-Zehnder waveguides, which supplies a predetermined signal to the main Mach-Zehnder waveguide; and adjusts bias signals supplied to the first and second Mach-Zehnder waveguides so as to lower an amplitude of an output light of the main Mach-Zehnder waveguide.

Since bias signals are adjusted in a state where a predetermined signal is supplied to a main Mach-Zehnder waveguide, bias signals supplied to the two sub Mach-Zehnder waveguides can be adjusted by the present invention without being dependent on an initial state of the main Mach-Zehnder waveguide.

[2] The bias adjustment method of the present invention is preferably the one described in the above-mentioned [1], wherein the predetermined signal supplied to the main Mach-Zehnder waveguide is an alternating current signal having an amplitude higher than amplitudes of the bias signals supplied to the first and second Mach-Zehnder waveguides.

[3] The bias adjustment method of the present invention is preferably the one described in the above-mentioned [1], wherein the predetermined signal supplied to the main Mach-Zehnder waveguide is a triangular wave. By using a triangular wave, since all states of the main Mach-Zehnder waveguide are monitored, the bias signal can be appropriately adjusted.

[4] The bias adjustment method of the present invention is preferably the one described in the above-mentioned [1], wherein the predetermined signal supplied to the main Mach-Zehnder waveguide is a triangular wave having an amplitude higher than amplitudes of the bias signals supplied to the first and second Mach-Zehnder waveguides.

[5] In order to solve the above-mentioned problems, another aspect of a bias adjustment method of the present invention is one for an optical SSB modulator or an optical FSK modulator including a first sub Mach-Zehnder waveguide, a second sub Mach-Zehnder waveguide and a main Mach-Zehnder waveguide equipped with the first and second Mach-Zehnder waveguides, which supplies radio frequency signals to the first and second Mach-Zehnder waveguides; and adjusts a bias signal supplied to the main Mach-Zehnder waveguide so as to reduce components other than a USB (Upper Side Band) signal and an LSB (Lower Side Band) signal.

[6] The bias adjustment method of the present invention is preferably the one described in the above-mentioned [5], wherein phases of the radio frequency signals supplied to the first and second Mach-Zehnder waveguides are adjusted while adjusting a bias signal supplied to the main Mach-Zehnder waveguide so as to reduce components other than a USB signal and an LSB signal.

[7] In order to solve the above-mentioned problems, another aspect of a bias adjustment method of the present invention is one for an optical SSB modulator or an optical FSK modulator including a bias adjustment process for a sub Mach-Zehnder waveguide adjusting a bias signal supplied to the sub Mach-Zehnder waveguide by using the bias adjustment method described in any one of the above-mentioned [1]-[4]; and a bias adjustment process for a main Mach-Zehnder waveguide adjusting a bias signal supplied to the main Mach-Zehnder waveguide by using the bias adjustment method described in the above-mentioned [5] or [6]. It is to be noted that the bias adjustment process for the sub Mach-Zehnder waveguide and the bias adjustment process for the main Mach-Zehnder waveguide may be respectively performed a plurality of times.

According to the present invention, a bias adjustment method for an optical SSB modulator or an optical FSK modulator capable of appropriately adjusting bias signals regardless of the initial state of the main Mach-Zehnder waveguide can be provided.

DETAILED DESCRIPTION OF THE PREFERRED EMBODIMENTS

1. Bias Adjustment Method of an Optical Modulator

The present invention relates to a bias adjustment method for an optical SSB modulator or an optical FSK modulator (hereinafter, collectively referred to as "optical modulator"). Hereinafter, a bias adjustment method of an optical modulator according to a first embodiment of the present invention will be described. The bias adjustment method according to this embodiment basically relates to one that obtains optimum bias signals (bias signals supplied to the first sub Mach-Zehnder waveguide and the second sub Mach-Zehnder waveguide) by removing an influence of the initial state of the main Mach-Zehnder waveguide by adjusting the bias signal in a state where a predetermined signal is deliberately inputted to the main Mach-Zehnder waveguide.

1.1. Basic Arrangement of an Optical Modulator

Figure 1:
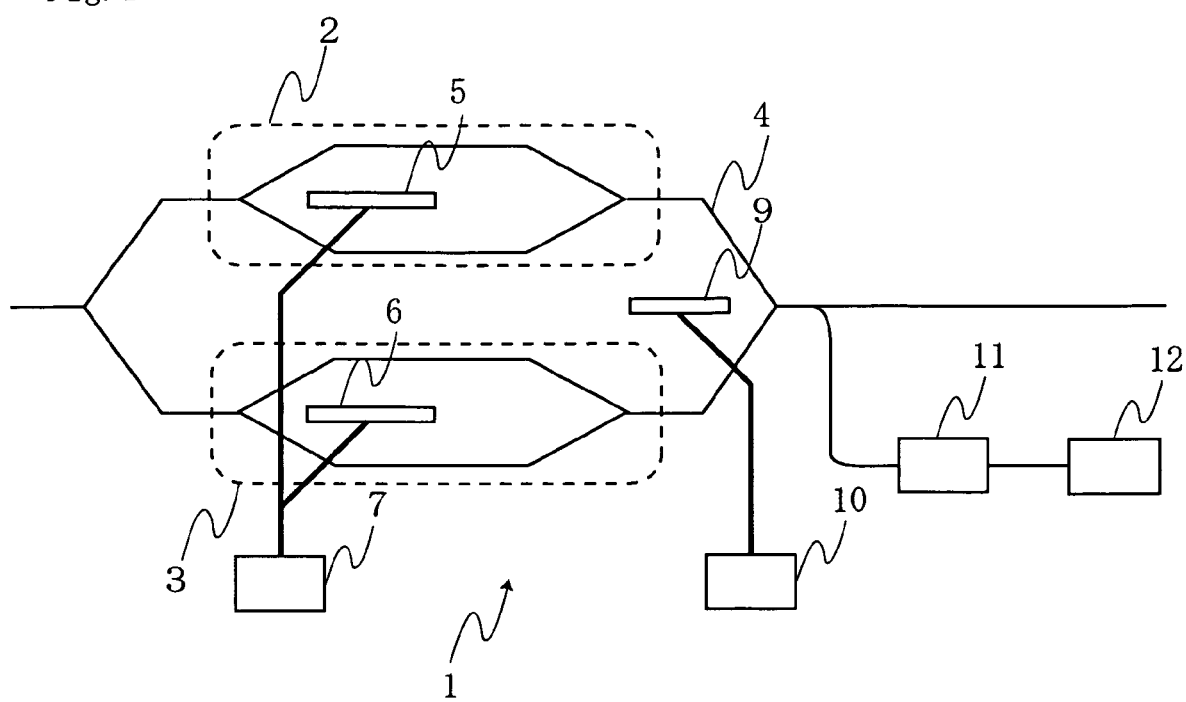
FIG. 1 is a schematic diagram showing a basic arrangement of a bias adjustment method according to the present invention.

FIG. 1 is a schematic diagram showing a basic arrangement of an optical modulator. As shown in FIG. 1, an optical modulator 1 is provided with a first sub Mach-Zehnder waveguide ($MZ_A$) 2, a second sub Mach-Zehnder waveguide ($MZ_B$) 3 and a main Mach-Zehnder waveguide ($MZ_C$) 4. Moreover, it may be provided with an electrode ($MZ_A$ electrode) 5 for supplying a signal to the $MZ_A$ 2, an electrode ($MZ_B$ electrode) 6 for supplying a signal to the $MZ_B$ 3, a first signal source 7 for supplying signals to the $MZ_A$ electrode 5 and the $MZ_B$ electrode 6, an electrode ($MZ_C$ electrode) 9 for supplying a signal to the $MZ_C$ 4, a second signal source 10 for supplying a signal to the $MZ_C$ electrode 9, an optical detector 11 for detecting an output light from the $MZ_C$ 4 and an indicator (oscilloscope) 12 for indicating an output of the optical detector.

1.2. Outline of Bias Adjustment Method

In this bias adjustment method, the bias signals supplied to the $MZ_A$ 2 and $MZ_B$ 3 are adjusted so that the amplitude of the output light of the $MZ_C$ 4 becomes low in a state where a predetermined signal is supplied to the $MZ_C$ electrode 9. It is to be noted that these bias signals are supplied from the first signal source 7 to the $MZ_A$ electrode 5 and $MZ_B$ electrode 6.

1.3. Predetermined Signal

The predetermined signal supplied to the $MZ_C$ 4 is not limited in particular as long as it is a signal which can cancel the influence of an initial state of the $MZ_C$ 4. As an example of the predetermined signal supplied to the $MZ_C$ 4, an alternating current signal having an amplitude equal to a half-wavelength voltage, i.e. a voltage required for shifting the phase of optical signal by 180°, of the $MZ_C$ electrode 9 or a larger amplitude thereof can be mentioned. An alternating current signal having a change in voltage equal to or more than twice the half-wavelength voltage is preferable. To be more precise, as an amplitude of the alternating current signal, equal to more than 5 V or equal to or more than 10 V can be mentioned. As the frequency of the alternating current signal, 1 kHz, 1 MHz, or 1 kHz-1 MHz can be mentioned. Although an inexpensive measurement equipment can be used when the frequency is low, there is a problem that the measurement requires time. Also, when the frequency is too high, there is a problem that the spread of the optical frequency by the measurement signal cannot be neglected.

A saw-tooth wave, a triangular wave, rectangular wave and the like can be mentioned as examples of the predetermine signal supplied to the $MZ_C$ 4. Among these, the triangular wave is preferable. This is because all of the states of the $MZ_C$ 4 are monitored with the same weight by using the triangular wave. It is to be noted that the same frequency and amplitude as those of the alternating current signal described above can be adopted for the signals mentioned herein.

1.4. Adjustment Example

Hereinafter, an adjustment example of the bias signal according to this embodiment will be described. The bias signals supplied to the $MZ_A$ 2 and $MZ_B$ 3 are supplied in a state where the predetermined signal is supplied to the $MZ_C$ 4. Then, a signal having the same form as the predetermined signal is outputted from the $MZ_C$ 4. For example, when a triangular wave is selected as the predetermined signal, the output signal also forms a triangular wave. The amplitude of the output signal depends on the amplitude of the bias signals supplied to the $MZ_A$ 2 and $MZ_B$ 3. Thus, by adjusting the amplitude of the output signal to have a minimum value, the bias signals supplied to the $MZ_A$ 2 and $MZ_B$ 3 can be adjusted to appropriate values.

1.5. Automatic Adjustment System

Although it is not specifically shown, it is preferable to provide a control apparatus 13 connected to the detector 11 and the first signal source 7 (as well as the second signal source 10). With this control apparatus 13, information related to the bias signals supplied to the $MZ_A$ 2 and $MZ_B$ 3 is supplied to the first signal source 7 based on information related to the output light detected by the detector 11. Namely, a system provided with this control apparatus 13 can automatically perform the bias adjustment method according to this embodiment.

2. Bias Adjustment Method for an Optical Modulator

Hereinafter, a bias adjustment method, i.e. a method for adjusting the bias signal supplied to the $MZ_C$ 4, for an optical modulator according to the second embodiment of the present invention will be described. In this bias adjustment method, radio frequency signals are supplied to the $MZ_A$ 2 and $MZ_B$ 3, and the bias signal supplied to the $MZ_C$ 4 is adjusted so as to reduce the components other than the USB signal and the LSB signal.

This bias adjustment method can be effectively used as a method for adjusting the bias signal supplied to the $MZ_C$ 4 after adjusting the bias signals supplied to the $MZ_A$ 2 and $MZ_B$ 3 specifically according to the bias adjustment method described above. Also, by repeating the bias adjustment method described above and the bias adjustment method according to this embodiment, the bias signals can be adjusted optimally.

With this method, the components other than the USB signal and the LSB signal can be reduced, so that a bias state where an appropriate output can be obtained is realized.

2.1. Phase Adjustment

Adjusting the bias signal supplied to the $MZ_C$ 4 so that the components other than the USB signal and the LSB signal are reduced while adjusting the phase of the radio frequency signals supplied to the $MZ_A$ 2 and $MZ_B$ 3 is a preferred embodiment of this bias adjustment method.

2.2. Automatic Adjustment System

Although it is not specifically shown, a system provided with a control apparatus 13 connected to the detector 11 and the second signal source 10, wherein the control apparatus 13 supplies information related to the bias signal supplied to the $MZ_C$ 4 to the second signal source 10 based on information related to the output light detected by the detector 11 can automate the bias adjustment method according to this embodiment.

3. Optical SSB Modulator

Hereinafter, an example of an optical SSB modulator used in the bias adjustment method of the present invention will be described referring to the drawings. An optical SSB modulator is an optical modulator capable of obtaining an output light having shifted by the frequency of the modulating signal. A signal with increased frequency is called a USB signal and a signal with decreased frequency is called an LSB signal.

3.1. Example of an Optical SSB Modulator

As shown in FIG. 1, the optical modulator 1 is provided with the first sub Mach-Zehnder waveguide ($MZ_A$) 2, the second sub Mach-Zehnder waveguide ($MZ_B$) 3 and the main Mach-Zehnder waveguide ($MZ_C$) 4. Moreover, it is provided with the electrode ($MZ_A$ electrode) 5 for supplying a signal to the $MZ_A$ 2, the electrode ($MZ_B$ electrode) 6 for supplying a signal to the $MZ_B$ 3, the first signal source 7 for supplying signals to the $MZ_A$ electrode 5 and the $MZ_B$ electrode 6, the electrode ($MZ_C$ electrode) 9 for supplying a signal to the $MZ_C$ 4 and the second signal source 10 for supplying a signal to the $MZ_C$ electrode 9.

A Mach-Zehnder ($MZ_A$) waveguide is a waveguide usually provided with two arms. The optical SSB modulator of this example is provided with two sub Mach-Zehnder waveguides $MZ_A$ and $MZ_B$, and a main MZ waveguide $MZ_C$ in which the two sub MZ waveguides are made the two arms. A known MZ waveguide can be used as the MZ waveguides and are not specifically limited.

The $MZ_A$ electrode 5, the $MZ_B$ electrode 6 and the $MZ_C$ electrode 9 are electrodes to which the bias signals for controlling the phase of the light transmitted through the MZ waveguides and the radio frequency (RF) signal that is the modulating signal are supplied. A bias adjustment electrode and a modulation electrode may be provided or a single electrode may serve as the two electrodes.

Figure 2:
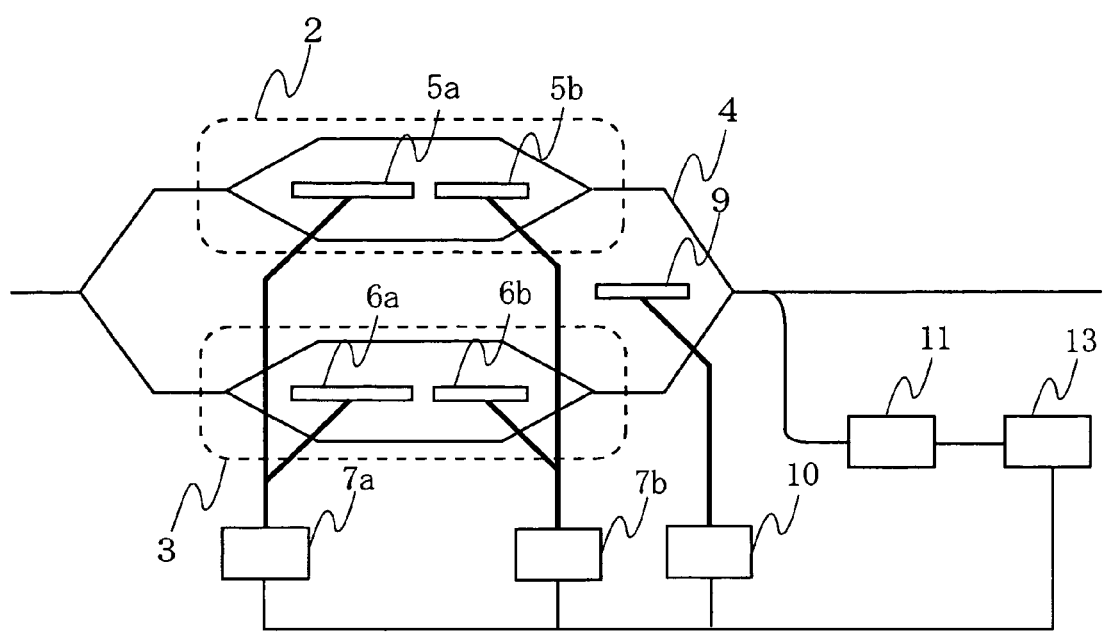
FIG. 2 is a schematic diagram showing a basic arrangement of a bias adjustment method according to the present invention.

FIG. 2 shows a basic arrangement of an optical SSB modulator in which the $MZ_A$ electrode 5 and the $MZ_B$ electrode 6 are composed of the bias adjustment electrode and the modulation electrode. Namely, in this optical SSB modulator, the bias adjustment electrodes are the first-third bias adjustment electrodes ($DC_A$ electrode (5a), $DC_B$ electrode (6a) and $DC_C$ electrode (9)). On the other hand, as the modulation electrodes, the first and the second modulation electrodes ($RF_A$ electrode (5b) and $RF_B$ electrode (6b)) can be mentioned.

The $DC_A$ electrode (5a) is an electrode for controlling the phase of the light transmitted through the two arms of the $MZ_A$ by controlling the bias voltage between the two arms composing the $MZ_A$. On the other hand, the $DC_B$ electrode (6a) is an electrode for controlling the phase of the light transmitted through the two arms of the $MZ_B$ by controlling the bias voltage between the two arms composing the $MZ_B$. The $DC_A$ electrode and the $DC_B$ electrode are preferably direct current electrodes or low frequency electrodes. It is to be noted that "low frequency" in the low frequency electrode means frequency of e.g. 0 Hz-500 MHz. A traveling-wave-type electrode or a resonant-type electrode can be mentioned as the $RF_A$ ($DC_A$) electrode and the $RF_B$ ($DC_B$) electrode, and the resonant-type electrode is preferable.

The $DC_C$ electrode (9) is an electrode for controlling the phase of the light transmitted through the $MZ_A$ and the $MZ_B$ by controlling the bias voltages of the $MZ_A$ and the $MZ_B$. The $DC_C$ electrode is preferably a direct current electrode or a low frequency electrode.

The $DC_A$ electrode 5a, the $DC_B$ electrode 6a and the $DC_C$ electrode 9 are composed of e.g. gold, platinum or the like. The $DC_A$ electrode 5a and the $DC_B$ electrode 6a are connected to the signal source 7a. Also, the $DC_C$ electrode 9 is connected to the signal source 10. The signal source 7a and the signal source 9 are devices for controlling the signals impressed to the $DC_A$ electrode, the $DC_B$ electrode and the $DC_C$ electrode, and a known signal source used in an optical modulator can be respectively adopted.

The $RF_A$ electrode (5b) is an electrode for inputting a radio frequency (RF) signal to the two arms composing the $MZ_A$. On the other hand, the $RF_B$ electrode (6b) is an electrode for inputting the RF signal to the two arms composing the $MZ_B$. A traveling-wave-type electrode or a resonant-type electrode can be mentioned as the $RF_A$ electrode and the $RF_B$ electrode, and the resonant-type electrode is preferable.

The $RF_A$ electrode 5b and the $RF_B$ electrode 6b are connected to the signal source 7b. The signal source 7b is preferably a high frequency signal source. The high frequency signal source is a device for controlling the RF signal transmitted to the $RF_A$ electrode and the $RF_B$ electrode. As the high frequency signal source, a known high frequency signal source used in the optical modulator can be adopted. As frequencies of the high frequency signal inputted to the $RF_A$ electrode and the $RF_B$ electrode, e.g. 1 GHz-100 GHz can be mentioned. As the output of the high frequency signal source, a sinusoidal wave having a fixed frequency can be mentioned.

The $RF_A$ electrode and the $RF_B$ electrode are composed of e.g. gold, platinum or the like. As the width of the $RF_A$ electrode and the $RF_B$ electrode, 1 μm–10 μm can be mentioned and 5 μm can be specifically mentioned. As the length of the $RF_A$ electrode and $RF_B$ electrode, 0.1 times-0.9 times the wavelength (fm) of the modulating signal can be mentioned including 0.18-0.22 times or 0.67-0.70 times, and more preferably shorter than the resonant point of the modulating signal by 20-25%. This is because with such a length, the synthesized impedance remains in an appropriate region. As a more specific length of the $RF_A$ electrode and the $RF_B$ electrode, 3250 μm can be mentioned. Hereinafter, a resonant-type electrode and a traveling-wave-type electrode will be described.

A resonant-type optical electrode (resonant-type optical modulator) is an electrode for performing a modulation by using resonance of a modulating signal. A known resonant-type electrode such as those described in the Japanese patent application laid-open 2002-268025 and Tetsuya Kawanishi, Satoshi Oikawa, Masayuki Izutsu, "Planar structure resonant-type optical modulator", TECHNICAL REPORT OF IEICE, IQE2001-3 (2001-05).

A traveling-wave-type electrode (traveling-wave-type optical modulator) is an electrode (modulator) for modulating light while guiding waves so that a lightwave and an electric signal are guided in the same direction (e.g. Hiroshi Nishihara, Masamitsu Haruna, Toshiaki Suhara, "optical integrated circuit" (revised and updated edition), Ohmsha, pages 119-120). A known traveling-wave-type electrode such as those disclosed in Japanese patent application laid-open Nos. 11-295674, 2002-169133, 2002-40381, 2000-267056, 2000-47159, and 10-133159, for example, can be adopted as the traveling-wave-type electrode.

As a preferable traveling-wave-type electrode, a so-called symmetrical-type earth electrode arrangement (one provided with at least a pair of earth electrodes on both sides of a traveling-wave-type signal electrode) is adopted. Thus, by symmetrically arranging the earth electrodes sandwiching the signal electrode, a high frequency wave outputted from the signal electrode is made easy to be impressed to the earth electrodes arranged on the left and right of the signal electrode, thereby suppressing an emission of a high frequency wave to the side of the substrate.

3.2. Another Example of an Optical SSB Modulator

Figure 3:
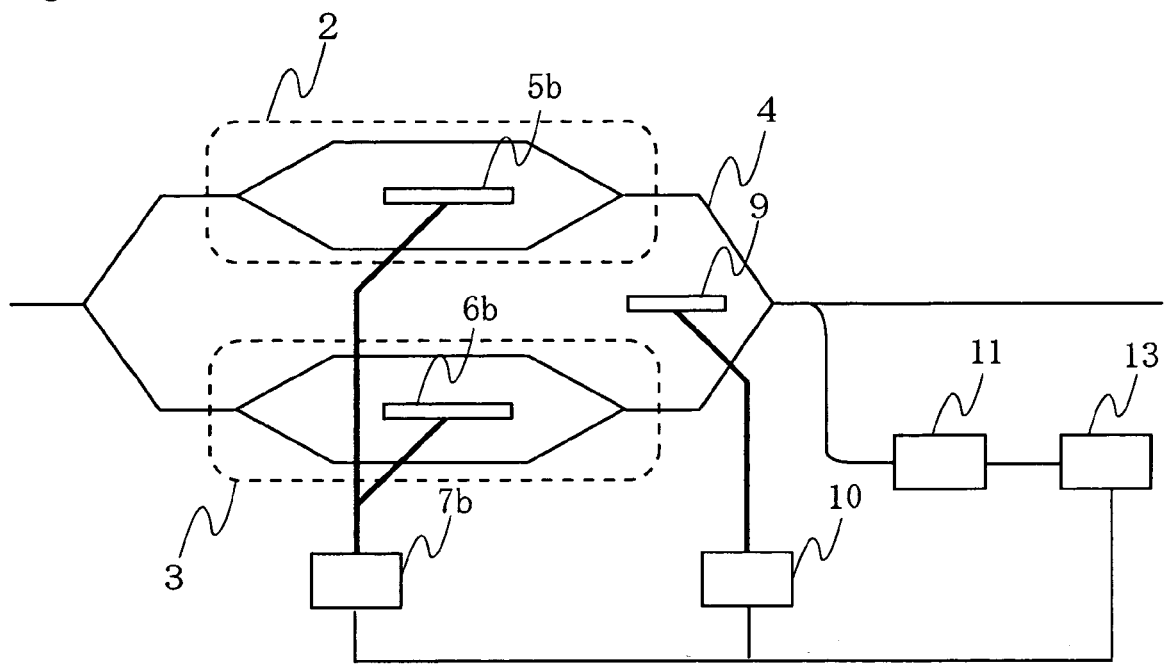
FIG. 3 is a schematic diagram showing a basic arrangement of a bias adjustment method according to the present invention.
Figure 4:
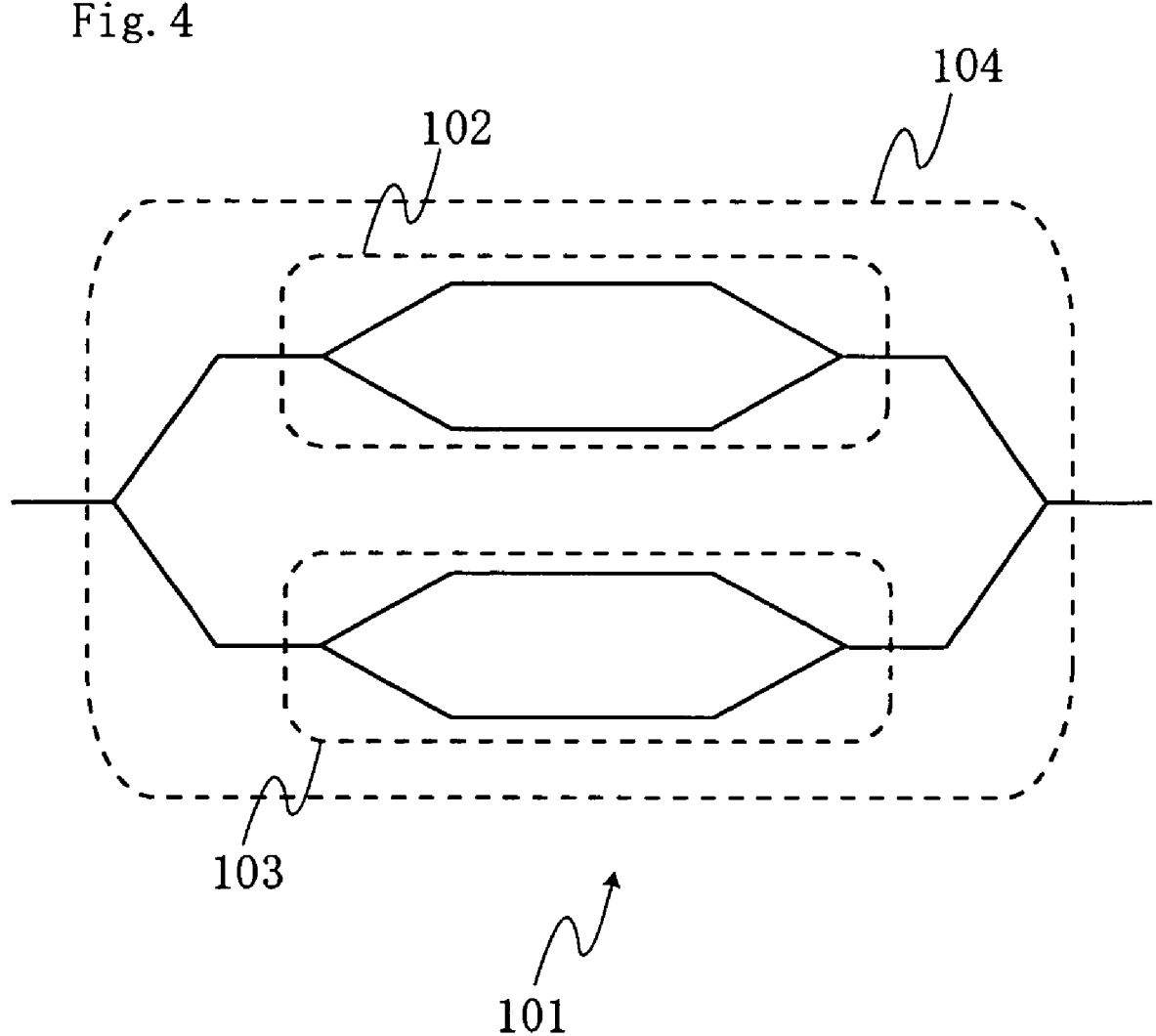
FIG. 4 is a schematic diagram showing a basic arrangement of an optical SSB modulator.

FIG. 3 is a schematic diagram showing a basic arrangement of an optical SSB modulator according to a different embodiment of the present invention. As shown in FIG. 3, the optical SSB modulator (1) of this example is provided with the first sub Mach-Zehnder waveguide ($MZ_A$) (2), the second sub Mach-Zehnder waveguide ($MZ_B$) (3), the main Mach-Zehnder waveguide ($MZ_C$) (4), the first modulation electrode ($RF_A$ electrode) (5b), the second modulation electrode ($RF_B$ electrode) (6b) and the third bias adjustment electrode ($DC_C$ electrode) (9). Output portions of either one of or both of the $MZ_A$ and the $MZ_B$ have an X-branching form. The basic operation of this optical SSB modulator is the same as that of the conventional optical SSB modulator.

In the optical SSB modulator of this embodiment, the modulation electrode acts as both of the electrodes for the RF signal and the DC signal in the optical SSB modulator described above. Namely, either one of or both of the $RF_A$ electrode and the RFB electrode are connected to a feeder circuit (bias circuit) for supplying the bias signal and the RF signal mixed. Since the optical SSB modulator of this embodiment has the RF electrode connected to the feeder circuit (bias circuit), the RF signal (radio frequency signal) and the DC signal (direct current signal: signal related to bias voltage) can be inputted to the RF electrode, so that it can function in the same way as the optical SSB modulator described above.

3.3. Manufacturing Method of an Optical SSB Modulator

As a manufacturing method of the above-mentioned optical SSB modulator, a known manufacturing method such as an internal diffusion method of a titanium diffusion method and the like or a proton exchange method can be used. For example, a method of directly forming an electrode on an LN ($LiNbO_3$) substrate without providing a buffer layer over a part of or the entire substrate by a thermal diffusion of titanium on the LN substrate can be mentioned. Also, a signal electrode and an earth electrode may be prepared by providing a buffer layer over the LN substrate and further forming thereon electrode patterns with titanium, gold or the like. Also, the optical modulator may have a multilayer structure with a film provided over a buffer layer. It is to be noted that a buffer layer formed of a dielectric can be mentioned, and more specifically a buffer layer formed of silicon dioxide can be mentioned. As for more specific manufacturing method of the optical SSB modulator, those described in the following documents may be used as appropriate: Japanese patent application laid-open No.2000-180802, [S. Shimotsu, S. Oikawa, T. Saitou, N. Mitsugi, K. Kubodera, T. Kawanishi and M. Izutsu, "Single Side-Band Modulation Performance of a LiNbO3 Integrated Modulator Consisting of Four-Phase Modulator Waveguides," IEEE Photon. Tech. Lett., Vol. 13, 364-366 (2001)], [Tetsuya Kawanishi, Masayuki Izutsu, "Optical frequency shifter using optical SSB modulator", TECHNICAL REPORT OF IEICE, OCS2002-49, PS2002-33, OFT2002-30 (2002-08)], [Tetsuya Kawanishi, Satoshi Oikawa, Masayuki Izutsu, "Planar structure resonant-type optical modulator", TECHNICAL REPORT OF IEICE, IQE2001-3 (2001-05)], [Higuma et al., "X-cut lithium niobium optical SSB modulator, Electron Letter, vol. 37, 515-516 (2001)] and [Hiroshi Nishihara, Masamitsu Haruna, Toshiaki Suhara, "optical integrated circuit" (revised and updated edition), Ohmsha, 2002). Specifically, with respect to a manufacturing method of an asymmetric crossed waveguide, those described in [Shimotsu Shinichi, Masayuki Izutsu, "LiNbO3 optical SSB modulator for next-generation communication", Optical Alliance, 2000.7. pp. 27-30] and the like may be used.

4. Optical FSK Modulator

The optical SSB modulators described so far can be applied, as is, to the optical FSK modulator. An optical frequency shift keying (FSK) is a technology which applies modulation to a frequency of light and transmits variations in the frequency as a signal. An FSK signal generally carries no information on its amplitude, so that it has a feature of being less subject to a level fluctuation or noise.

In the optical FSK modulator, in order to realize a high speed switching, an electrode corresponding to the $DC_C$ 9 of the optical FSK modulator is substituted with a combination of a modulation electrode and a bias electrode or with only the modulation electrode (in this case modulating signal and bias signal are supplied to the RF electrode). An electrode used instead of the $DC_C$ electrode is the $RF_C$ electrode. The $RF_C$ electrode is preferably a traveling-wave-type electrode supporting a high speed switching.

Also in the FSK modulator, the USB and the LSB can be switched over to be outputted by switching over the signal voltage of the $RF_C$ electrode. When a traveling-wave-type electrode corresponding to the RF frequency is used as the $RF_C$ electrode, the above-mentioned frequency shifting can be performed at a high speed.

As a signal source for controlling the signal transmitted to the $RF_C$ electrode of the optical FSK modulator, a known signal source can be adopted. The use of a signal source (FSK signal source) which can set a plurality of voltage levels to be switched over is preferable since the optical FSK modulator is enabled to perform a multivalued modulation. As a signal to be inputted from the signal source to the $RF_C$ electrode, a signal having a frequency component of preferably between 500 MHz and 300 GHz both inclusive can be mentioned, which preferably assumes 500 MHz-10 GHz. It is to be noted that the frequency of the signal transmitted to the $RF_C$ electrode controlled by the signal source is preferably smaller compared to the frequencies of the signals transmitted to the $RF_A$ electrode and the $RF_B$ electrode. This is because the apparatus becomes complicated if the frequency of the signal transmitted to the $RF_C$ electrode controlled by the signal source is larger compared to the frequencies of the signals transmitted to the $RF_A$ electrode and the $RF_B$ electrode.

The optical SSB modulator and the optical FSK modulator of the present invention are used in the field of optical data communication and the like as a superior optical modulator compared to the conventional ones.

What is claimed is:

1. A bias adjustment method for an optical SSB modulator or an optical FSK modulator including a first sub Mach-Zehnder waveguide, a second sub Mach-Zehnder waveguide and a main Mach-Zehnder waveguide equipped with the first and second Mach-Zehnder waveguides, comprising the steps of:

supplying a predetermined signal to the main Mach-Zehnder waveguide;

adjusting bias signals supplied to the first and second Mach-Zehnder waveguides so as to lower an amplitude of an output light of the main Mach-Zehnder waveguide;

wherein the predetermined signal supplied to the main Mach-Zehnder waveguide is an alternating current signal having an amplitude higher than amplitudes of the bias signals supplied to the first and second Mach-Zehnder waveguides.

2. A bias adjustment method for an optical SSB modulator or an optical FSK modulator including a first sub Mach-Zehnder waveguide, a second sub Mach-Zehnder waveguide and a main Mach-Zehnder waveguide equipped with the first and second Mach-Zehnder waveguides, comprising the steps of:

supplying a predetermined signal to the main Mach-Zehnder waveguide;

adjusting bias signals supplied to the first and second Mach-Zehnder waveguides so as to lower an amplitude of an output light of the main Mach-Zehnder waveguide;

wherein the predetermined signal supplied to the main Mach-Zehnder waveguide is a triangular wave.

3. A bias adjustment method for an optical SSB modulator or an optical FSK modulator including a first sub Mach-Zehnder waveguide, a second sub Mach-Zehnder waveguide and a main Mach-Zehnder waveguide equipped with the first and second Mach-Zehnder waveguides, comprising the steps of:

supplying a predetermined signal to the main Mach-Zehnder waveguide;

adjusting bias signals supplied to the first and second Mach-Zehnder waveguides so as to lower an amplitude of an output light of the main Mach-Zehnder waveguide;

wherein the predetermined signal supplied to the main Mach-Zehnder waveguide is a triangular wave having an amplitude higher than amplitudes of the bias signals supplied to the first and second Mach-Zehnder waveguides.

4. A bias adjustment method for an optical SSB modulator or an optical FSK modulator including a first sub Mach-Zehnder waveguide, a second sub Mach-Zehnder waveguide and a main Mach-Zehnder waveguide equipped with the first and second Mach-Zehnder waveguides, comprising the steps of;

supplying radio frequency signals to the first and second Mach-Zehnder waveguides;

adjusting a bias signal supplied to the main Mach-Zehnder waveguide so as to reduce components other than a USB signal and an LSB signal;

wherein phases of the radio frequency signals supplied to the first and second Mach-Zehnder waveguides are adjusted while adjusting a bias signal supplied to the main Mach-Zehnder waveguide so as to reduce components other than a USB signal and an LSB signal.

5. A bias adjustment method for an optical SSB modulator or an optical FSK modulator, comprising the steps of:

a bias adjustment process for a sub Mach-Zehnder waveguide adjusting a bias signal supplied to the sub Mach-Zehnder waveguide by using the bias adjustment method according to any one of claims 1 to 4; and a bias adjustment process for a main Mach-Zehnder waveguide adjusting a bias signal supplied to the main Mach-Zehnder waveguide by a bias adjustment method for an optical SSB modulator or an optical FSK modulator including a first sub Mach-Zehnder waveguide, a second sub Mach-Zehnder waveguide and a main Mach-Zehnder waveguide equipped with the first and second Mach-Zehnder waveguides, comprising the steps of:

supplying radio frequency signals to the first and second Mach-Zehnder waveguides; and adjusting a bias signal supplied to the main Mach-Zehnder waveguide so as to reduce components other than a USB signal and an LSB signal, wherein phases of the radio frequency signals supplied to the first and second Mach-Zehnder waveguides are adjusted while adjusting a bias signal supplied to the main Mach-Zehnder waveguide so as to reduce components other than a USB signal and an LSB signal.

* * * * *